April 26, 1966   L. P. KUMPF   3,247,948
CONVEYING APPARATUS FOR PLATING EQUIPMENT
Filed July 15, 1964   6 Sheets-Sheet 1

April 26, 1966  L. P. KUMPF  3,247,948
CONVEYING APPARATUS FOR PLATING EQUIPMENT
Filed July 15, 1964  6 Sheets-Sheet 4

United States Patent Office 3,247,948
Patented Apr. 26, 1966

3,247,948
CONVEYING APPARATUS FOR PLATING
EQUIPMENT
Leonard P. Kumpf, Affton, Mo., assignor to Lasalco Incorporated, St. Louis, Mo., a corporation of Missouri
Filed July 15, 1964, Ser. No. 382,879
16 Claims. (Cl. 198—19)

This invention relates to conveying apparatus and more particularly to apparatus for conveying workpieces to various work stations, such as in plating equipment or the like.

The invention is particularly concerned with a modification of the conveying apparatus shown in the copending coassigned U.S. patent application of myself and Arthur G. Bignall, Serial No. 269,111, filed March 29, 1963, entitled Conveying Apparatus, issued as U.S. Patent No. 3,193,121, July 6, 1965. The apparatus shown in said application generally comprises a horizontal track, a plurality of carriages spaced at intervals along the track, and adapted for movement in one direction along the track, a workpiece lifter carried by each carriage for lifting and lowering movement relative to the carriage thereby to lift workpieces out of and lower them into various tanks, an elevator movable up and down between first and second positions adjacent the track, slide means carried by the elevator for up and down movement therewith and generally horizontal sliding movement relative thereto, means for moving the slide means away from and back to a retracted position, and pushers carried by said slide means operable on movement of said elevator from first to second position with said slide means in retracted position to effect lifting of said lifters, and then operable on movement of said slide means away from retracted position to push the carriages along the track, said lifters being lowered on movement of the elevator to its said first position, and said slide means and pushers then being returnable to retracted position without moving the carriages. As disclosed in said application, the carriages are spaced at equal intervals all around the track, and all the lifters are lifted just before the carriages are advanced one step, in order to lift the workpieces out of the tanks, and lowered after the carriage advance to lower the workpiece into the tanks. In certain cases one or more of the tanks in which electroplating operations are carried out may be a so-called "multistation tank," as distinguished from a single-station tank. In the multistation tank, the workpieces are spaced the same distance as elsewhere around the track. With this spacing, it may be necessary to use special workpiece racks with so-called "robbers" for proper electroplating of the workpieces. Also, use of a relatively long multistation tank is necessitated, and this increases cost (such tanks, among other factors, having relatively costly linings).

Accordingly, among the several objects of this invention may be noted the provision of a conveying apparatus of the general class such as above mentioned in which the workpieces are automatically brought closer together in the multistation tank (or tanks), thereby closing up the spaces between the workpieces in the multistation tank (or tanks) for better control of electroplating, the operation approaching that of the electroplating of a continuous strip being fed at a constant rate, and without any necessity for the use of "robbers"; the provision of a conveying apparatus such as described as to which the multistation tank (or tanks) may be of reduced length (in view of the closeness of the workpieces therein), thereby cutting down on tank cost (and particularly on cost of lining); and the provision of conveying apparatus such as described which is of relatively simple and economical construction and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in side elevation of a conveying apparatus constructed in accordance with the present invention;

FIG. 3 is an enlarged fragmentary plan view generally on line 3—3 of FIG. 1;

Corresponding reference characters indicate corresponding parts throughout the several views of the drawings.

Figure 1:
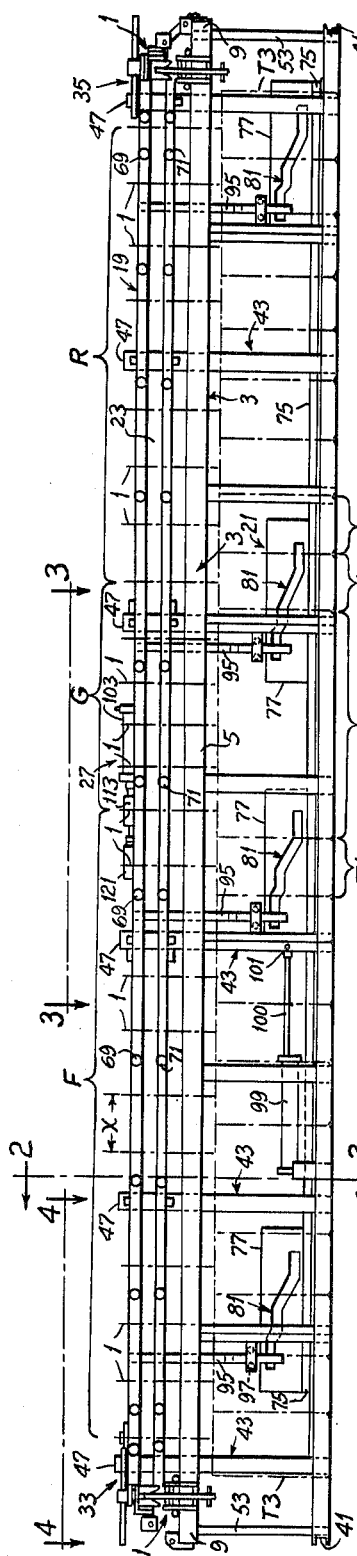

Referring to the drawings, a conveying apparatus constructed in accordance with this invention is shown to comprise a plurality of carriages generally designated 1 adapted for travel on an elevated track generally designated 3. This track comprises two parallel straight rail sections 5 and 7, which are of considerable length, and two semicircular end rail sections, each designated 9. One end rail section connects the straight rail sections 5 and 7 at one end thereof and the other end rail section connects the straight rail sections at the other end thereof, thereby providing an endless or closed-loop track arrangement.

Track 3 occupies an elevated position above an array of tanks, this array being shown as including a series of tanks T1 located laterally outward of straight rail section 5 on one side of the apparatus, and a series of tanks T2 located laterally outward of straight rail section 7 on the other side of the apparatus. As shown in FIGS. 1 and 7–10, one of the tanks in the series T1 is longer than the others in this series, and the longer tank, which is specially designated T1a, may be referred to as a multistation tank. At the ends of the apparatus are semicircular tanks T3, one of which appears in FIG. 4. It will be understood that there may be a similar semicircular tank at the other end of the apparatus. The tanks are shown in phantom in FIG. 1.

Carriages 1 are spaced along the track 3. For convenience, carriages 1 are shown in detail in FIG. 1 only on the semicircular end rail sections. It will be understood that carriages are provided all along the track at intervals such as indicated by the dash lines generally designated 1 in FIG. 1. As appears in FIGS. 3 and 7–10, the spacing of the carriages can be different in various zones along the track. As shown, the carriages are closer together in the zone of the multistation tanks T1a than elsewhere. To facilitate the description, certain of the carriage positions are specially designated 1A to 1G in FIGS. 1, 3 and 7–10. As appears in FIG. 7, carriage position 1A is above the tank T1 immediately forward (to the left) of the multistation tank T1a. Carriage positions 1B–1F are above (i.e., in the zone of) the multistation tank. Carriage position 1G is above the tank T1 immediately rearward (to the right) of the multistation tank. The carriages are adapted intermittently to be advanced along the track while maintaining the closer spacing of the carriages in the zone of the multistation tank and the greater spacing of the carriages elsewhere. The carriages advance clockwise around the closed-loop track as indicated by the arrows in FIG. 4 (from right to left as viewed in FIGS. 7–10).

Each carriage 1 has a lifter constituted by an arm 11 pivoted thereon for swinging movement on a horizontal axis as indicated at 13 with this axis extending parallel to the track. The pivot is intermediate the ends of the arm, so that the arm has a portion 11a extending laterally outward from the track, and a portion 11b extending laterally inward from the track. Outer portions 11a of the arms extend over the tanks. Each arm has a pin 14 at its outer end for hanging a workpiece carrier 15 thereon. As shown, carrier 15 consists of a rack having a hook 17 at its upper end for hanging it on a pin 14, and has suitable means therein for holding a workpiece W (or a plurality of workpieces). Other types of workpiece carriers may be used; it is contemplated, for example, that rotatable barrel-type workpiece carriers may be used on the arms.

Figure 2:
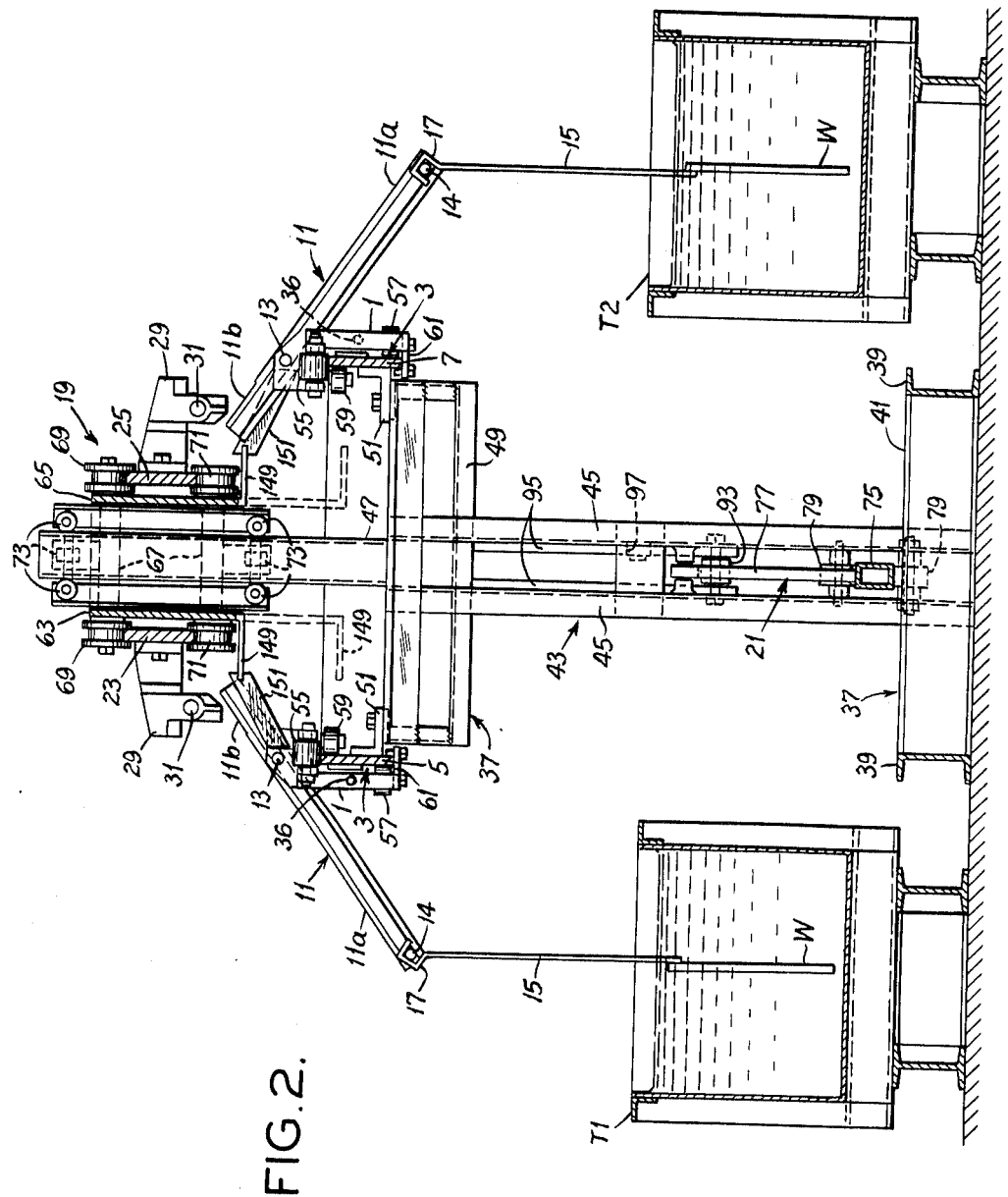
FIG. 2 is an enlarged section taken on line 2—2 of FIG. 1 and showing workpieces in liquid-treating tanks on each side of the apparatus of FIG. 1.

FIG. 2 shows two arms 11 on opposite sides of the apparatus in what may be termed their lower position. In this lowered position of the arms, the workpiece W on the carrier 15 hung on each arm is immersed in liquid treating bath in a respective tank T1 or T2. It will be apparent that by swinging the arms upward, the workpieces will be lifted out of the tanks, and then, by moving the carriages 1 forward one station, the arms and workpieces may be brought into a position over the next successive tanks in the series of tanks. Then, arms 11 may be allowed to swing down to dip the workpieces in the baths in the latter tanks. The workpieces W in tanks T3 and in the multistation tanks T1a need not be elevated to advance through the tanks.

At 19 is generally indicated an elevator which is adapted for up and down vertical movement between the straight side rail sections 5 and 7 of track 3. This elevator extends generally from one end of the apparatus to the other between rail sections 5 and 7. Means indicated generally at 21 is provided for vertically raising and lowering this elevator. FIG. 2 shows the elevator in its fully raised position. The elevator carries elongate horizontal slide bars 23 and 25 at opposite sides thereof. These move up and down with the elevator, and are also adapted for horizontal longitudinal sliding movement relative to the elevator. Bars 23 and 25 extend generally the full length of the elevator. Means indicated generally at 27 in FIG. 3 is provided on the elevator for effecting longitudinal sliding movement of bars 23 and 25 relative to the elevator. This means is adapted to slide the bars 23 and 25 back and forth equal distances in opposite directions. During one phase of the cycle of operation of the apparatus, bar 23 moves toward the left and bar 25 moves toward the right as viewed in FIG. 4 and during another phase of the cycle of operation, bar 23 moves back toward the right and bar 25 moves back toward the left. Movement of bar 23 toward the left and movement of bar 25 toward the right may be referred to as forward movement of these bars, since in such movement the carriages are advanced. Movement of bar 23 toward the right and movement of bar 25 toward the left may be referred to as return movement of these bars, and the FIG. 4 position of the bars may be regarded as their retracted position. The carriages do not move during the stated return movement of the bars.

Figure 7:
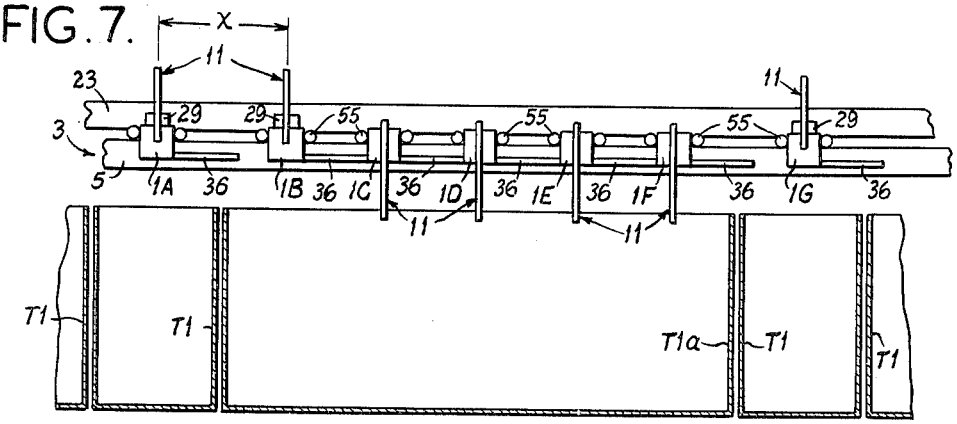
FIGS. 7–10 are diagrammatic views showing how the workpieces are advanced.

Each of the slide bars 23 and 25 carries a series of couplers in the form of yokes 29 like those shown in the above-mentioned copending application but, instead of having a complete series of yokes on the slide bar 23, the yokes are omitted at positions corresponding to carriage positions 1C–1F shown in FIG. 7. In other words, on slide bar 23 there are in effect two groups of yokes 29 with a gap therebetween, with the yokes in each group spaced a distance X (the maximum yoke and carriage spacing). The forward one of these two groups is indicated by the bracket F in FIG. 1, the rearward one of these two groups is indicated by the bracket R in FIG. 1, and the gap between the groups is indicated by the bracket G in FIG. 1. When slide bar 23 is in its rearward retracted position of FIG. 7, the rearward yoke of the forward group is at carriage position 1B and the forward yoke of the rearward group is at carriage position 1G.

Each coupler or yoke 29 has a crosspin 31. When the elevator is lowered from its FIG. 2 raised position, the yokes 29 come down and straddle the inner ends 11b of the arms 11, and pins 31 on the yokes engage the inner ends of arms 11 from above and swing the outer portions 11a of arms 11 upward, thereby lifting the workpieces out of the tanks. With the yokes straddling the arms 11, the slide bars 23 and 25 are coupled to the carriages. Bars 23 and 25 are then moved forward to advance the carriages one step, thereby advancing the coupled carriages and the associated workpieces one station. Then the elevator is raised, whereupon the outer end portions of arms 11 swing down for dipping the workpieces. Yokes 29 disengage from the arms (see FIG. 2), and then bars 23 and 25 return to their retracted FIG. 4 position, completing the cycle and positioning the parts for the start of the next cycle. Means indicated generally at 33 is provided for moving the carriages around the semicircular left end rail section and similar means indicated generally at 35 is provided for moving the carriages around the semicircular right end rail section.

Figure 9:
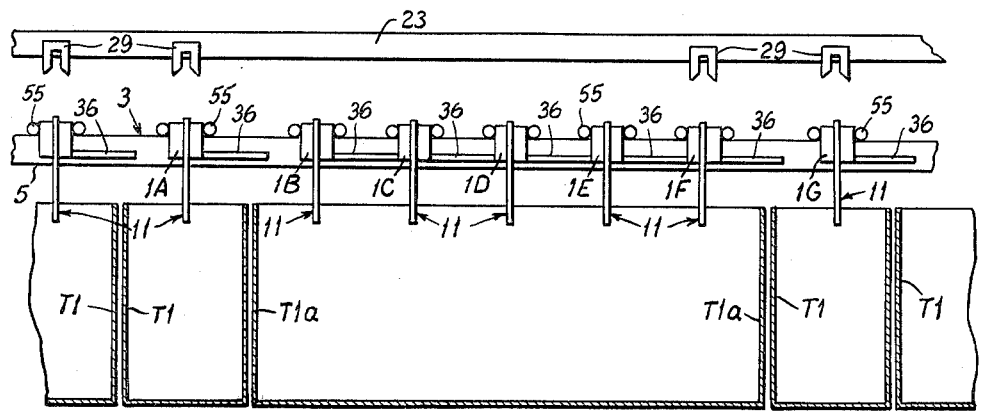

Each lifter is brought over the rearward end of multistation tank T1a while lifted, then is lowered to dip the respective workpiece in tank T1a, remains lowered while it advances through tank T1a to the forward end of this tank, and then is lifted to lift the workpiece out of the tank. FIG. 9 shows the lifter associated with the carriage at position 1F lowered at the rear of the tank T1a. It is then indexed through four advancing steps to position 1B, then lifted, and moved out of the zone of the multistation tank on the fifth step.

Each of the carriages has an endwise extension or spacer 36, shown as constituted by a rod extending rearward from the rear end of the carriage. The length of this rod is selected so that the overall length of each carriage (i.e., from its forward end to the rearward end of its rod or extension 36) corresponds to the desired close spacing of the lifters in the multistation tank T1a. Thus, if an eighteen-inch spacing is desired for the lifters in tank T1a, the length of rod 36 is selected so that the overall length of the carriage (including the rod) is eighteen inches. This is less than the spacing of the couplers or yokes 29, which may be twenty-four inches, for example. In the zone of the multistation tank T1a, the carriages are interengageable end-to-end (i.e., the forward end of one carriage engages the rearward end of rod 36 of the next carriage) in said zone for advance of the carriages through said zone by the pushing action of the carriage at the rear of said zone and the end-to-end interengagement of the successive carriages in said zone. Thus, as the coupler 29 shown at the right of FIG. 7 at position 1G moves the respective carriage forward to position 1F to advance an elevated workpiece over the rear wall of tank T1a (its right end wall as shown in FIG. 7), after an interval of lost motion as regards the carriage moving forward from position 1G, the forward end of this carriage engages the rear end of the next carriage at 1F (i.e., the rear end of the rod 36 which extends rearward from the carriage at 1F), and advances the latter and also the remainder of the carriages in the zone of the multistation tank. In this zone, the spacing of the carriages is determined by their overall length, and is less than the spacing of the carriages elsewhere (where it is determined by the distance between centers of adjacent yokes 29). If desired, the rods 36 may be removed to place the carriages in direct end-to-end engagement with each other as the workpieces pass be long enough to separate the carriages the same distance through the multistation tank. Also, the rods 36 could as the couplers are spaced and the couplers can then be removed from bars 23, 25 except for one coupler at the end of each bar.

It is to be understood that yokes without pins 31 may be provided in the zone of the multistation tank to eliminate lifting of arms 11 in this zone while providing for advance of the carriages due to the coupling of yokes 29 and the carriages when the yokes are lowered. In this manner, the carriages may be equally spaced around the track 3.

Figure 5:
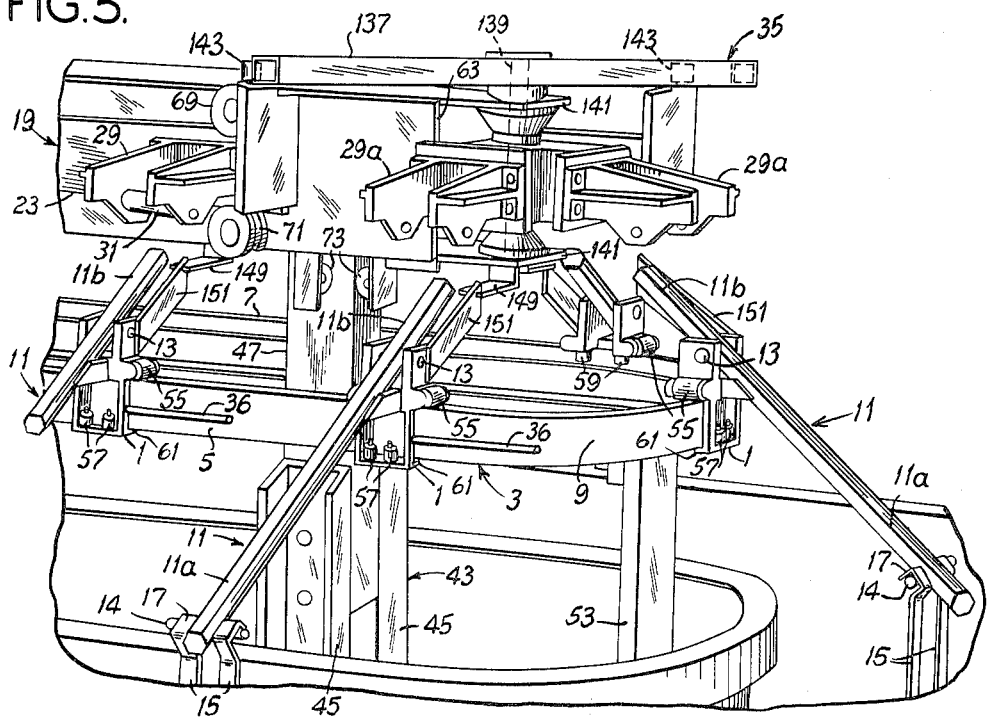
FIG. 5 is an enlarged perspective of the end portion of the apparatus showing a moved position of parts.

More particularly, the apparatus comprises a main frame generally designated 37. This frame comprises a base constituted by a pair of elongate channels 39 extending generally the full length of the apparatus, held in spaced parallel relation by transverse members 41. Extending up from the base at intervals along its length are posts generally designated 43. Each post has a lower portion comprising a pair of spaced channels 45 and an upper portion 47 of box cross section. Crossbeams 49 at the upper ends of the lower portions of the posts support the straight rail sections 5 and 7. Each of the latter consists of an elongate flat bar mounted vertically in respect to the crossbeam by means of angle brackets such as indicated at 51. The semicircular end rail sections are curved bars in continuation of the straight rail sections. Supports such as indicated at 53 (FIG. 5) may be provided for the semicircular end rail sections. Each carriage has top rollers such as indicated at 55 (FIG. 2) which roll on top of the track 3, outside rollers 57 which engage the outside of the track, inside rollers 59 which engage the inside of the track, and bottom slide members 61. For light duty conveying apparatus, the rolers 55, 57 and 59 may be replaced by nylon bars or guides (not shown).

Elevator 19 comprises a pair of elongate side plates 63 and 65 held in spaced parallel relation by transverse members 67. These plates extend generally the full length of the apparatus. Bar 23 is mounted for horizontal sliding movement on the outside of plate 63 by means of upper and lower grooved rollers 69 and 71. Bar 25 is mounted for horizontal sliding movement on the outside of plate 65 by means of similar rollers 69 and 71. For light duty conveyor apparatus the rollers 69, 71 may be replaced by nylon guides (not shown). The elevator is guided for vertical up and down movement by means of rollers such as indicated at 73 in FIGS. 2 and 4 on the elevator which are in rolling contact with the upper portions 47 of the posts 43.

Figure 6:
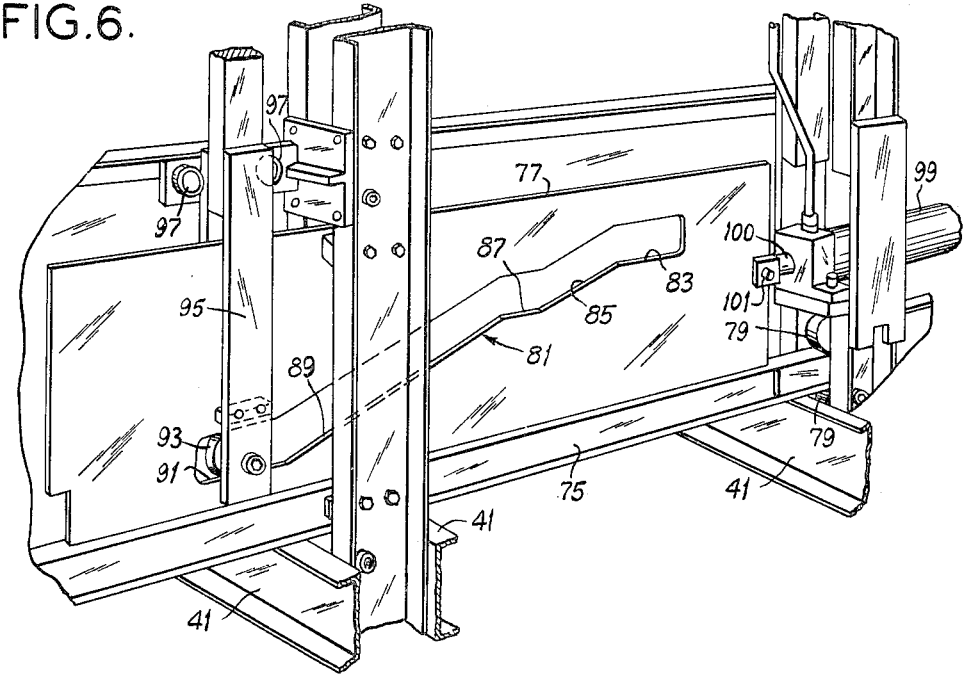
FIG. 6 is an enlarged fragmentary detail perspective.

The means 21 (FIGS. 2 and 6) for raising and lowering the elevator is shown to comprise an elongate bar 75 mounted for reciprocation longitudinally of the apparatus and carrying a number of cam plates 77 spaced at intervals along its length. This bar is accommodated in the space between channels 45 of the lower portions of posts 43 just above the base of frame 37, and is mounted for reciprocation by means of upper and lower rollers 79. Each cam plate 77 has a cam slot 81 therein having an upper horizontal end portion 83, a short inclined ramp portion 85 extending from portion 83 to an intermediate horizontal dwell portion 87, and a longer inclined ramp portion 89 extending from dwell portion 87 to a lower horizontal end portion 91. Riding in the cam slots are follower rolls 93 at the lower end of vertical struts 95 which are secured at their upper ends to the elevator. Guide rollers for struts 95 are indicated at 97. A hydraulic cylinder 99 is mounted on the base of frame 37. A piston rod 100 extends from a piston (not shown) in cylinder 99 to a connection at 101 with one of the cam plates. When piston rod 100 is fully extended (see FIG. 1), bar 75 and cam plates 77 occupy a position wherein follower rolls 93 are in the upper horizontal end portions 83 of the cam slots, and the elevator 19 is accordingly raised. On partial retraction of the piston rod 100, bar 75 and cam plates 77 move to the left as viewed in FIG. 1, rolls 93 ride down the ramp portions 85 of the cam slots to the dwell portions 87 of the cam slots, and the elevator is partially lowered, and allowed to dwell in this partially lowered position for a dwell interval. Then, on completion of retraction of the piston rod 100, rolls 93 ride down the ramp portions 89 to the lower horizontal end portions 91 of the cam slots (see FIG. 6), completing the lowering of the elevator. As will be apparent, on extension of the piston rod, bar 75 and cam plates 77 are moved to the right back to their FIG. 1 position, and the elevator is raised.

The means 27 for moving the slide bars 23 and 25 longitudinally relative to the elevator comprises a pair of hydraulic cylinders 103 and 105 mounted side-by-side between the elevator side plates 63 and 65 extending longitudinally of the elevator. A piston rod 107 extends from a piston 109 in cylinder 103 to a connection at 111 with a flange 113 extending from bar 23 over the top of plate 63. A piston rod 115 extends from a piston 117 in cylinder 105 to a connection at 119 with a flange 121 extending from bar 25 over the top of plate 65. Both cylinders have their head ends toward the left as viewed in FIGS. 1 and 3, and both piston rods 107 and 115 extend out of the cylinders toward the left. Hydraulic lines 123 and 125 are connected to ports at the head ends of the cylinders, a hydraulic line 127 interconnects ports at the right ends of the cylinders. The arrangement is such that on supplying hydraulic fluid to the left end of cylinder 105 via line 125 and venting the left end of cylinder 103 via line 123, piston rod 115 is retracted and piston rod 107 is simultaneously extended, thereby moving bar 23 toward the left and bar 25 to the right. Then, by supplying hydraulic fluid to the left end of cylinder 103 via line 123 and venting the left end of cylinder 105 via line 125, piston rod 107 is retracted and piston rod 115 is simultaneously extended, thereby moving bar 23 back toward the right and moving bar 25 back toward the left. The stroke of the cylinders and hence the stroke of bars 23 and 25 correspond to the carriage spacing.

Figure 4:
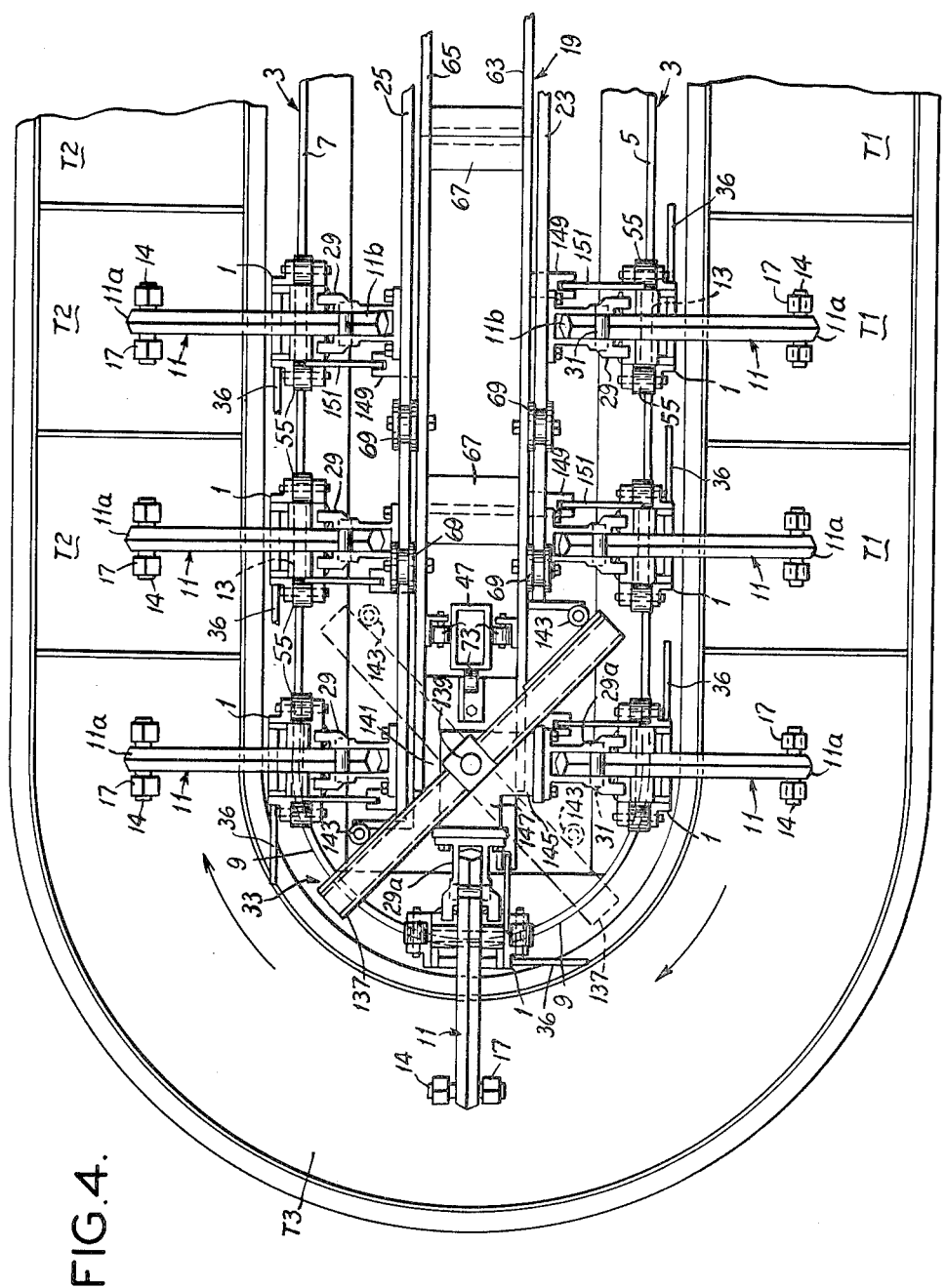
FIG. 4 is an enlarged plan of an end portion of the apparatus of FIG. 1 viewed generally on line 4—4 of FIG. 1.

Each means 33 and 35 for moving the carriages around the semicircular end rail sections comprises a lever 137 fixed at its center on the upper end of a vertical shaft 139 journalled in horizontal plates 141 at the respective end of the elevator 19. Slide bars 23 and 25 carry rollers 143 at their ends engageable with the lever for oscillating the lever through an angle of 90° on operation of the slide bars. Thus, as shown in FIG. 4 for the left end of the apparatus, when bar 23 moves to the left and bar 25 moves to the right, lever 137 at the left end of the apparatus is swung clockwise from the retracted solid line position to the dotted line position shown in FIG. 4. Concomitantly, the lever 137 at the right end of the apparatus will be swung from a retracted position parallel to the FIG. 4 solid line position of lever 137 to a position parallel to the FIG. 4 dotted line position of lever 137. Then, when bars 23 and 25 are retracted, the lever 137 at the left end of the apparatus is swung back to its FIG. 4 retracted solid line position, and the lever 137 at the right end of the apparatus is concomitantly swung back to its retracted position. Each shaft 139 has radial arms 145 and 147 at right angles to one another and at 45° angles to the lever 137, these arms carrying yokes 29a like yokes 29 at their outer ends.

It is to be understood that arms 145 and 147 could be arranged at different angles to each other if desired to move lever 137 about a different angular path. Accordingly, any desired degree of movement about the ends of conveying apparatus could be obtained.

Means is provided to lock the carriages 1 against movement on the track 3 when the elevator is raised, so that the spacing of the carriages will not be inadvertently disturbed. This means comprises a series of slotted keepers 149 (FIGS. 4 and 5) on the elevator slide plates 63 and 65 projecting laterally outward therefrom at their lower edges. Each carriage 1 has a tongue 151 extending laterally inward and engageable in the slot in a keeper 149 when the elevator is raised to lock the carriage against movement on the track. When the elevator is lowered, keepers 149 disengage from the tongues (see the dotted line position of the elevator side plates and keepers shown in FIG. 2) to unlock the carriages for movement on the track by yokes 29 and 29A which advance the carriages. The carriages in the zone of the multistation tank are held against inadvertent movement by the rods 36 between adjacent carriages. Therefore, keepers 149 need not be provided at this zone.

Figure 10:
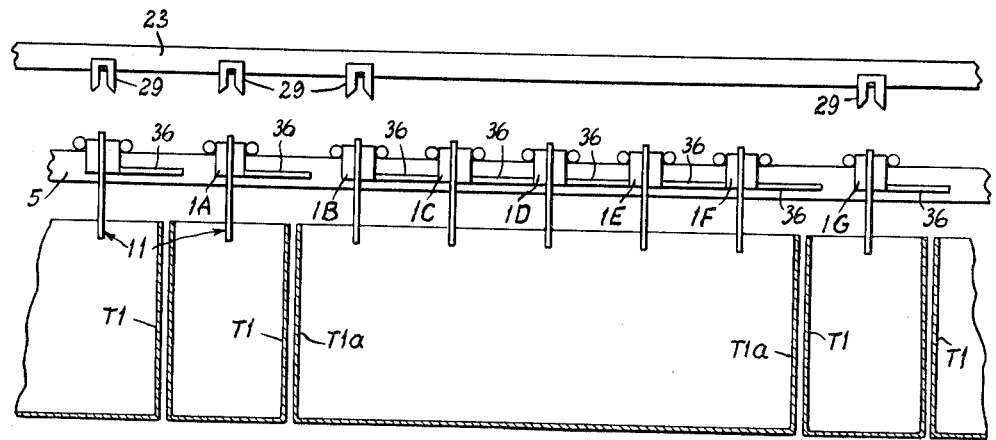

Operation is as follows:

As shown in FIGS. 1, 2, 5 and 10, the elevator 19 is in its fully raised position, bar 75 and cam plates 77 thereon being at the right-hand end of their stroke as viewed in FIG. 1, followers 93 accordingly being in the upper horizontal end portions 83 of the cam slots 81. With the elevator so raised, yokes 29 are aligned with carriages in each single-station tank T1 and the end tanks T3. Also, one of the yokes 29 is above the carriage at 1B at the forward (left) end of the multistation tank as shown in FIG. 10. The inner end portions 11b of arms 11 are released, and outer end portions 11a of arms 11 are inclined downward so that workpieces W are down in the tanks. Carriages 1 are then locked against movement on track 3 by engagement of tongues 151 on carriages in the slotted keepers 149 on the elevator side plates 63 and 65 and by the rods 63 on the carriages in the zone of the multistation tank. Cylinder 99 is then operated partially to retract piston rod 100 to move bar 75 and cam plates 77 to the left as viewed in FIG. 1, to the point where followers 93 are in the intermediate dwell portions 87 of the cam slots 81, and bar 75 and cam plates 77 are allowed to dwell in this position for a dwell interval. As the cam plates 77 move toward the left to the dwell position, followers 93 ride down ramp portions 85 of the cam slots, and elevator 19 is partially lowered to an intermediate position wherein yokes 29 and 29a straddle the inner end portions 11b of arms 11 on the aligned carriages. The yoke pins 31 are slightly above end portions 11b so that the arms 11 remain in their FIG. 2 lowered position.

During the stated dwell interval, a workpiece carrier 15 which has passed completely through the treatment is unloaded from the arm 11 on which it has been previously carried around, and another workpiece carrier 15 carrying a workpiece W is positioned for being carried through the treatment. With the yokes straddling the inner end portion 11b of the arms 11, the carriages are rigidly locked against displacement on track 3, so as to prevent accidental disturbance of the spacing of the carriages. In this respect it will be noted that it is important to maintain the spacing between the carriages during the unloading and loading dwell interval, and a stronger locking action is desirable during this interval than that afforded by keepers 149 and tongues 151.

Upon completion of unloading and loading, operation of cylinder 99 is resumed to complete the retraction of piston rod 100, and elevator 19 is accordingly completely lowered to the FIG. 7 position. Pins 31 on yokes or couplers 29 and 29a then push down the inner end portions of arms 11 on all the carriages except those at positions 1C–1F, thereby swinging the outer end portions 11a of these arms upward to lift the workpieces generally vertically out of the tanks (except the workpieces on the arms at positions 1C–1F). It will be observed that the arm 11 on the forward carriage in the zone of the multistation tank (the carriage at position 1B) is lifted so that the workpiece hung thereon may advance to the next tank. The workpieces are lifted in vertical transverse planes, and with only a slight transverse movement, and their lift may be regarded as substantially vertical. Following the upward swinging of the outer end portions 11a of arms 11, cylinders 103 and 105 are actuated to move slide bars 23 and 25 through a forward stroke (i.e., bar 23 is moved toward the left and bar 25 is moved to the right). The arms 11 on the carriages at positions 1A, 1B and 1G are straddled by yokes 29 to couple the carriages to the bar 23, and the coupled carriages are positively pushed forward one step to the next station (i.e., advanced a distance corresponding to the yoke spacing). Each arm 11 that is in raised position holding the respective workpiece W above the series of tanks moves from a position over one tank to a position over the next tank.

Figure 8:
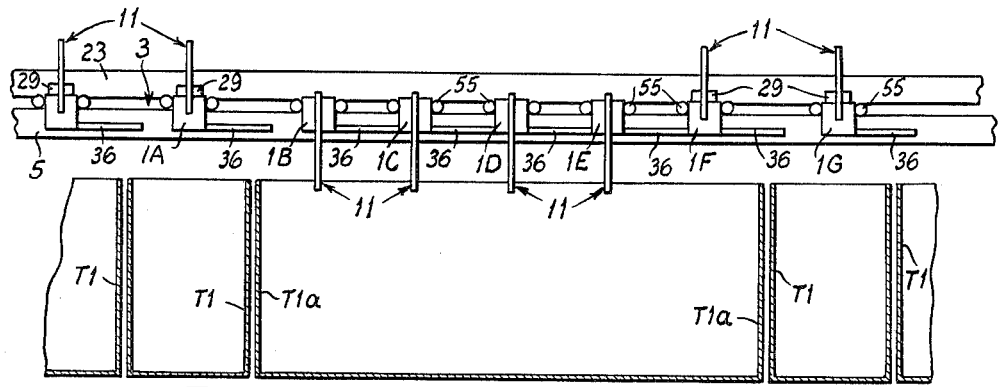

The carriages are thus advanced from the FIG. 7 position to the FIG. 8 position. The carriages at positions 1C to 1F in the multistation tank zone which are not directly coupled to the yokes are advanced by pushing action of the carriage at the rear of the zone and the interengagement of successive carriages in the zone. Thus, the carriage which moves forward from position 1G to 1F after an interval of lost motion (six inches of lost motion in the case of eighteen and twenty-four inch centers given above as an example) comes into engagement with the rear end of the carriage at 1F, and then advances the interengaged carriages on the multistation tank zone one close-spacing step (e.g., eighteen inches). The forward carriage in the zone (the carriage at 1B) is positively advanced a greater distance (e.g., twenty-four inches), and separates from the preceding carriage.

As the bars 23 and 25 move through their stated forward stroke, they act to swing levers 137 and yokes 29a around so that yokes 29a push the carriages 1 with which they have become coupled around the semicircular end rail sections 9 of the track. Thus, all the carriages are moved around the track one step from one station to the next succeeding station.

Following each one-step advance of the carriages 1 around the track 3 (with the outer end portions 11a of arms 11 raised upon engagement with pins 31), cylinder 99 is actuated fully to raise the elevator 19 and move the carriages 1, arms 11 and yokes 29 to their FIG. 9 position. This allows the arms on the carriages at 1A, 1F and 1G to swing down for dipping the workpieces in the tanks. The workpieces are lowered in vertical transverse planes with only a slight transverse movement, and their descent may be regarded as substantially vertical. Raising of the elevator results in uncoupling of yokes 29 and 29a from the inner ends 11b of arms 11. Cylinders 103 and 105 are then actuated to retract the slide bars 23 and 25, i.e., to return bar 23 to the right and to return bar 25 to the left to their FIGS. 4 and 10 retracted position. This retraction of bars 23 and 25 occurs without reverse movement of carriages 1, since with the elevator 19 raised, yokes 29 and 29a are not coupled to the carriages. Retraction of bars 23 and 25 results in return of levers 137 and yokes 29 and 29a to their retracted position, and all parts are thus returned to retracted position for the start of the next cycle of operation.

It will be understood that tanks may be omitted at certain stations, for example at loading and unloading stations. As to the yokes 29 for such stations, the yoke pins 31 may be omitted to eliminate lifting of arms 11 at such stations while still providing for carriage advance due to coupling of the yokes to the carriages when the elevator 19 descends. Also, the yokes 29 can be entirely omitted at loading and unloading stations and the carriages moved by the rods 36.

It will be observed that the couplers or yokes 29 on each slide bar constitute means movable in a vertical plane in a generally rectangular path including a generally vertical downward stroke on descent of the elevator 19 from the FIG. 10 to the FIG. 7 position, a generally horizontal forward stroke on advance of the slide bars (the FIG. 7 to FIG. 8 movement), a generally vertically upward stroke on raising of the elevator (the FIG. 8 to FIG. 9 movement), and a generally horizontal return stroke on retraction of the slide bars (to the FIG. 10 position). On the downward stroke, lifter arms 11 are lifted. On the forward stroke, the carriages are advanced (pushed forward one step). On the upward stroke, arms 11 are lowered. On the return stroke of the slide bars, carriages 1 do not move, yokes 29 then being uncoupled from the carriages since the elevator is raised.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Conveying apparatus comprising a plurality of carriages movable in one direction along a predetermined path, a lifter carried by each carriage for lifting and lowering movement relative to the carriage, and means for advancing the carriages and lifting and lowering the lifters, said carriages at least in one predetermined zone of their path of travel being interengageable end-to-end for advance of the carriages through said zone by the pushing action of the carriage at the rear of said zone and the end-to-end interengagement of successive carriages in said zone.

2. Conveying apparatus as set forth in claim 1 wherein said carriages are adapted for being spaced apart along said path forward and rearward of said zone, and said means effects interengagement of the carriages as they enter said zone and separation of the carriages as they exit from said zone.

3. Conveying apparatus as set forth in claim 2 wherein said means is adapted to effect intermittent advance of the carriages along said path with the lifters on the carriages in said zone lowered, and with other lifters lifted.

4. Conveying apparatus as set forth in claim 3 wherein said means comprises a plurality of couplers adapted for interengagement with said other lifters, and means for moving said couplers in a generally rectangular path having upward, downward, forward and rearward components.

5. Conveying apparatus comprising an endless track, a plurality of carriages movable in one direction around the track, said carriages being capable of movement relative to one another along the track, a lifter carried by each carriage for lifting and lowering movement relative to the carriage, means for advancing the carriages and lifting and lowering the lifters, each carriage having an endwise extension engageable by an end of an adjacent carriage, and said carriages at least in one predetermined zone of their path of travel around said track being adapted for end-to-end interengagement via said extensions for advance of the carriages through said zone by the pushing action of the carriage at the rear of said zone and the end-to-end interengagement of successive carriages in said zone.

6. Conveying apparatus as set forth in claim 5 wherein said carriages are adapted for being spaced apart along said track forward and rearward of said zone, and said means effects interengagement of said extensions and carriages as the carriages enter said zone and separation of said extensions and carriages as they exit from said zone.

7. Conveying apparatus as set forth in claim 6 wherein said means is adapted to effect intermittent advance of the carriages along said track with the lifters in said zone lowered, and with other lifters lifted.

8. Conveying apparatus as set forth in claim 7 wherein said means comprises a plurality of couplers adapted for interengagement with said outer lifters, and means for moving said couplers in a generally rectangular path having upward, downward, forward and rearward components.

9. Conveying apparatus comprising a generally horizontal fixed track, a series of carriages movable on the track, a lifter carried by each carriage for lifting and lowering movement relative to the carriage, said carriages being adapted to travel along certain regions of the track with a predetermined spacing therebetween for a predetermined spacing of the lifters in said regions and to travel along a certain zone of the track between said regions in bunched-up end-to-end interengagement for closer spacing of the lifters in said zone, and a plurality of couplers movable in a generally rectangular path through a cycle comprising an initial generally vertical stroke in one vertical direction, a generally horizontal forward stroke, a generally vertical stroke in the opposite vertical direction and a generally horizontal return stroke and interengageable during the initial vertical stroke only with the lifters in said regions and the forward lifter in said zone for effecting lifting of the lifters in said regions and the forward lifter in said zone without lifting the other lifters in said zone, advance of all the carriages on the forward stroke, and lowering of the lifted lifters on the opposite vertical stroke said couplers moving through a return stroke without moving the carriages.

10. Conveying apparatus as set forth in claim 9 wherein said initial generally vertical stroke of the couplers is downward and the subsequent vertical stroke is upward, and the couplers effect lifting of the lifters on the downward stroke and lowering of the lifters on the upward stroke.

11. Conveying apparatus as set forth in claim 10 wherein each lifter comprises an arm pivotally mounted on its respective carriage, said couplers becoming coupled with the arms in said regions and the forward arm in said zone for advancing the carriages along the track on the forward stroke of the couplers, and being uncoupled from the arms on movement through a return stroke.

12. Conveying apparatus comprising a generally horizontal fixed track, a series of carriages movable on the track, a lifter carried by each carriage for lifting and lowering movement relative to the carriage, said carriages being adapted to travel along certain regions of the track with a predetermined spacing therebetween for a predetermined spacing of the lifters in said regions and to travel along a predetermined zone of the track between said regions in bunched-up end-to-end interengagement for closer spacing of the lifters in said zone, an elevator movable up and down between first and second positions adjacent the track, slide means carried by the elevator for up and down movement therewith and generally horizontal sliding movement relative thereto, means for moving the slide means away from and back to a retracted position, and a series of couplers carried by said slide means with a gap in said series of couplers corresponding to said zone, said couplers being located when said slide means is in retracted position and said elevator moves from its first to its second position for interengagement with and lifting of the lifters only in said regions and the forward lifter in said zone, and then operable on movement of said slide means away from retracted position immediately to push the carriages in said regions and then to push the carriages in said zone along the track after an interval of lost motion corresponding to the difference between the spacing of the lifters in said regions and the spacing of the lifters in said zone, and with separation of the forward carriage in said zone from preceding carriage in said zone, the raised lifters being lowered on movement of the elevator to its first position, and said slide means and couplers then being returnable to retracted position without moving the carriages.

13. Conveying apparatus as set forth in claim 12 wherein said first position of the elevator is a raised position and said second position of the elevator is a lowered position, said lifters thereby being lifted on lowering of the elevator and lowered on raising of the elevator.

14. Conveying apparatus comprising a generally horizontal track having straight parallel side rail sections and semicircular end rail sections, a series of carriages movable on the track, an arm pivoted on each carriage for swinging movement on an axis parallel to the track, said arms extending laterally outward from the track, an elevator extending longitudinally of the apparatus between the side rail sections and movable vertically between raised and lowered positions, a pair of slide bars carried on opposite sides of the elevator for vertical movement therewith and horizontal sliding movement relative thereto, means carried by the elevator for simultaneously sliding the slide bars in opposite directions away from and back to a retracted position, a series of couplers on each slide bar, said couplers being operable on descent of the elevator to its lowered position with said slide bars in retracted position to engage inner end portions of the arms of the carriages on said side rail sections and swing the outer end portions of these arms upward and to become coupled to these carriages via engagement with the inner end portions of the arms, said bars then being slidable away from their retracted position to push these carriages forward along the side rail sections, said elevator then being movable upward to its raised position for disengagement of the pushers from the arms for lowering of the arms, and said bars then being movable back to retracted position without moving any of the carriages, and means for moving the carriages around the semicircular end rail sections, the carriages in a predetermined zone of at least one side rail section being interengaged end-to-end for relatively close spacing of the lifters on the carriages in said zone, and the carriages forward and rearward of said zone being spaced apart for wider spacing of the lifters, the series of couplers on the slide bar on the side of the elevator toward said one side rail section having a gap therein along said zone and being located when this slide bar is retracted and on descent of the elevator to engage inner end portions of the arms of the carriages forward and rearward of said zone and the arm on the forward carriage in said zone.

15. Conveying apparatus as set forth in claim 14 wherein each carriage has an extension from one end thereof interengageable with an adjacent carriage.

16. Conveying apparatus as set forth in claim 15 wherein the extensions extend rearward from the carriages.

References Cited by the Examiner
UNITED STATES PATENTS 3,013,678  12/1961  Clark _____ 214—89
3,058,604  10/1962  Harper et al. _____ 214—89

SAMUEL F. COLEMAN, *Primary Examiner.*